3,123,478
METHOD OF PRODUCING A SNOW CONE MIX AND PRODUCT THEREOF
Clarence Cash Powell, West Sacramento, Calif., assignor to Crystal Ice & Cold Storage Co.
No Drawing. Filed July 21, 1961, Ser. No. 125,658
4 Claims. (Cl. 99—137)

The invention relates generally to frozen confections and, more particularly, to an improved snow cone mix and method of making the same.

Snow cones have long been a favorite, hot-weather type of frozen confection. As heretofore made, a scoop of finely crushed ice, or "snow," as it is termed, is placed into a paper cup, or cone. This is followed by pouring syrup flavoring over the "snow."

Not only does the syrup not cover all of the ice particles, under this arrangement, but the great bulk of the syrup immediately runs down through the ice and settles at the bottom of the cup, leaving the upper portion of the cone substantially devoid of flavoring.

It is therefore an object of the invention to provide a snow cone mix which is not stratified from top to bottom but which, instead, is uniformly flavored throughout.

It is another object of the invention to provide an improved snow cone mix which can be quickly handled since it does not require first scooping, then pouring liquid from a syrup bottle.

It is another object to provide a mix which saves labor since its use speeds up dispensing, a factor of great importance during rush periods.

It is yet another object of the invention to provide a snow cone mix which is especially suitable for packaging and sale not only to commercial users but to individual families, as well.

It is still another object of the invention to provide a snow cone mix which can be stored for long periods in home refrigerators, or freezers, without congealing or stratifying.

It is a further object of the invention to provide a snow cone mix whose quality can be controlled.

It is a still further object of the invention to provide a delicious frozen confection which can be made and packaged under highly sanitary conditions, and which can be dispensed to the ultimate consumer under far more hygienic conditions than those which have heretofore obtained.

It is yet a further object of the invention to provide a snow cone mix which is economical and which can be sold in a large variety of package sizes.

It is another object of the invention to provide a method of producing a snow cone mix and product thereof.

Other objects, together with the foregoing, are attained in the method and product described in the following description.

While the method and product of the invention are susceptible of numerous physical embodiments, and processes of manufacture, depending upon the environment and requirements of use, very substantial quantities of the hereinafter described snow cone mix have been made in accordance with the preferred process specified, and the resultant product has been widely sold with a high degree of customer acceptance.

The entire process is carried out in a space having a relatively low temperature, preferably below 32° F.

As a first step, ice is crushed in a conventional crusher, the ice being preferably of the hard-frozen, or clear, commercial-ice variety, as distinguished from ice having large numbers of occluded air bubbles or water contaminants, such as precipitated minerals.

The crushing operation reduces the ice to a large number of comminuted particles of random dimensions and sizes.

Thereafter, the crushed ice is screened through a screen having a mesh size of substantially one fourth of an inch, the ice particles passing through the screen being collected in a bin. At this juncture, the finely divided, random size ice particles are quite similar, in appearance, to snow, and, for convenience of terminology, will sometimes be referred to as such.

From the bin, the snow is conveyed to a tumbler, such as an appropriately mounted, rotatable barrel. At this stage, a predetermined quantity of the crushed and screened ice is mixed in the tumbler with a predetermined quantity of flavoring syrup. In order to determine a suitable range of proportions of syrup to snow, a panel of recognized food experts was employed. It was determined that for twenty pounds of snow, the optimum quantity of syrup, of the particular kind used, is forty eight ounces. It was also determined by the taste panel that the use of thirty to seventy ounces of syrup to twenty pounds of snow provides a highly satisfactory and acceptable product.

It is important to note that the kind of syrup used in the method and product of the invention is quite critical in achieving the end result. The syrup is of the type known in the confectioner's art as highly stabilized syrup. Among the properties characterizing syrups, such as flavor strength, sugar content, freezing point, viscosity, color, kind of flavor, acid content and degree of stabilization (as by the use of vegetable gums) the two most important characteristics in connection with the present invention are considered to be freezing point and degree of stabilization.

In sum, the syrup used should be highly stabilized and should preferably have a freezing point below 0° F., for reasons that will hereafter be explained.

As was set forth above, predetermined quantities of snow and syrup are mixed in a tumbling machine, with tumbling being carried on until substantially every particle of ice is coated with a substantially uniform film of the highly-stabilized, low-freezing point syrup.

While adjacent, touching films appear, to some degree, to coalesce, or merge, or share a mutual connecting layer, there does not seem to be any significant quantity of free or interstitial syrup. It would appear that the aggregate surface area of all the individual ice particles is so great as largely to adsorb the entire amount of available syrup. This result, it is believed, is highly desirable since the surface tension of the film or coating on each particle is thus capable of resisting any tendency toward subsequent stratification owing to gravity.

After the step of tumbling, the coated snow is packaged, preferably in closed packages.

Promptly after packaging, the packages are removed to a storage space having an ambient temperature of less than 26° F., and preferably of the order of 10° F. or even somewhat lower.

From this space, the packages can be withdrawn, as required, and transported under comparable temperature conditions to the point of sale, which might be, for example, the frozen confection counters of a super-market.

The effect of the coating of highly-stabilized and low-freezing point syrup is that not only is separation or stratification prevented, but congealing or hardening of the snow cone mix is avoided.

This latter feature is of particular commercial importance since it enables the ultimate consumer to open the package and scoop out any desired quantity of the mix with a minimum of effort. In other words, by keeping the individual particles separated by a film which has not frozen, the mix remains friable and in discrete particle form and can readily be scooped out, as by a scoop or spoon, into a cup or cone, available for immediate use.

It can therefore be seen that I have provided a highly convenient, delicious and novel frozen confection, and process of manufacturing the same.

What is claimed is:

1. An improved snow cone mix comprising:
    a. a plurality of finely comminuted ice particles; and
    b. a film of highly stabilized flavoring syrup having a freezing point below 0° F. substantially uniformly coating each one of said plurality of ice particles with a thin film, said film having a thickness such that adjacent touching film portions define hollow interstices devoid of free syrup.

2. A packaged snow cone mix comprising: a container filled with finely comminuted ice particles, each of said particles being surrounded by and isolated from adjacent ice particles by a thin film of flavoring syrup having a freezing point less than 0° F. and being highly stabilized such that said particles remain discrete and friable in a storage space having an ambient temperature of the order of 10° F.

3. A method of producing an improved snow cone mix comprising the steps: of tumbling a predetermined quantity of finely comminuted ice with a predetermined quantity of highly stabilized syrup having a freezing point below 0° F. until each ice particle is coated with a thin substantially uniform thickness of syrup; and of thereafter storing the coated ice particles at a temperature less than 26° F. and higher than the freezing point of the syrup.

4. A method of producing a snow cone mix comprising the steps: of mixing twenty pounds of finely comminuted ice with thirty to seventy ounces of a highly stabilized flavoring syrup having a freezing point below 0° F.; of tumbling the mixture until the ice particles are substantially uniformly coated with syrup; of packaging the coated ice; and of thereafter removing the packaged mix to a storage space having an ambient temperature of less than 26° F. and higher than the freezing temperature of the syrup.

References Cited in the file of this patent

UNITED STATES PATENTS

| | | |
|---|---|---|
| 1,167,563 | Ingram | Jan. 11, 1916 |
| 1,505,448 | Van Sant | Aug. 19, 1924 |
| 2,598,137 | Schulz et al. | May 27, 1952 |